(12) United States Patent
Zhao

(10) Patent No.: US 12,224,988 B2
(45) Date of Patent: Feb. 11, 2025

(54) DEVICE CONTROL METHOD, DEVICE CONTROL APPARATUS AND STORAGE MEDIUM

(71) Applicant: Beijing Xiaomi Mobile Software Co., Ltd., Beijing (CN)

(72) Inventor: Yang Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 274 days.

(21) Appl. No.: 17/661,183

(22) Filed: Apr. 28, 2022

(65) Prior Publication Data
US 2023/0164120 A1     May 25, 2023

(30) Foreign Application Priority Data
Nov. 22, 2021     (CN) .......................... 202111386339.6

(51) Int. Cl.
*H04L 9/40*     (2022.01)
*H04L 43/10*    (2022.01)
*H04W 52/02*    (2009.01)

(52) U.S. Cl.
CPC .......... *H04L 63/0281* (2013.01); *H04L 43/10* (2013.01); *H04L 63/0428* (2013.01); *H04W 52/0222* (2013.01); *H04W 52/0235* (2013.01)

(58) Field of Classification Search
CPC ................... H04L 63/0281; H04L 63/0428
USPC ............................................................ 726/12
See application file for complete search history.

(56) References Cited

U.S. PATENT DOCUMENTS

| 9,036,616  | B2 * | 5/2015 | Sundararajan ........ H04W 76/25 370/503 |
| 9,712,486  | B2 * | 7/2017 | Johnson ................ H04W 12/35 |
| 9,756,089  | B2 * | 9/2017 | Brook ................. H04L 65/1083 |
| 10,080,193 | B1 * | 9/2018 | Bleu-Laine ....... H04W 52/0212 |
| 11,128,438 | B1 * | 9/2021 | Konda ................ H04L 63/0263 |

(Continued)

FOREIGN PATENT DOCUMENTS

| CN | 102209302 A | 10/2011 |
| CN | 106161598 A | 11/2016 |

(Continued)

OTHER PUBLICATIONS

Li, Y., "Design and Security Implement of a System that Manage the Remote Devices Real Time," Overall System Security, Jul. 2016, 3 pages. (Submitted with English Abstract).

*Primary Examiner* — Dant B Shaifer Harriman
(74) *Attorney, Agent, or Firm* — McCoy Russell LLP

(57) ABSTRACT

A device control method, includes: sending first device information to a proxy device; obtaining second device information; establishing a first connection with the cloud server, and sending the device information of the proxy device to the cloud server through the first connection, so as to establish a second connection between the proxy device and the cloud server based on the first device information and the second device information, the second connection being configured to transmit the keep-alive message; and in response to determining that notification information sent by the cloud server is received, controlling the Internet of Things device to enter a low power consumption mode, the notification information being configured to indicate that the second connection has been established between the proxy device and the cloud server.

16 Claims, 17 Drawing Sheets

(56) References Cited

U.S. PATENT DOCUMENTS

| | | | |
|---|---|---|---|
| 11,789,514 B2* | 10/2023 | Yu | H04L 67/56 |
| | | | 713/310 |
| 2016/0007288 A1* | 1/2016 | Samardzija | H04W 52/0229 |
| | | | 370/311 |
| 2016/0100022 A1* | 4/2016 | Kim | H04L 67/141 |
| | | | 709/227 |
| 2017/0262039 A1* | 9/2017 | Das | G06F 1/3212 |
| 2017/0289916 A1* | 10/2017 | Pingili | H04W 4/20 |
| 2018/0063079 A1* | 3/2018 | Ding | H04L 63/0464 |
| 2018/0176079 A1* | 6/2018 | Teo | H04W 52/0219 |
| 2019/0306242 A1* | 10/2019 | Thummalapalli | H04L 41/0806 |
| 2020/0304589 A1* | 9/2020 | Isberg | H04L 67/12 |
| 2020/0412629 A1* | 12/2020 | Kim | H04L 43/0811 |
| 2021/0081021 A1* | 3/2021 | Yu | G06F 1/3209 |
| 2021/0306434 A1* | 9/2021 | Chifor | H04W 4/10 |
| 2021/0329727 A1* | 10/2021 | Yu | H04W 24/04 |
| 2022/0182937 A1* | 6/2022 | Guo | H04W 52/0212 |
| 2022/0247624 A1* | 8/2022 | Johnson | H04L 67/131 |

FOREIGN PATENT DOCUMENTS

| | | |
|---|---|---|
| CN | 109756450 A | 5/2019 |
| CN | 111194702 A | 5/2020 |
| CN | 112448822 A | 3/2021 |
| CN | 113099521 A | 7/2021 |

* cited by examiner

DEVICE CONTROL METHOD, DEVICE CONTROL APPARATUS AND STORAGE MEDIUM

CROSS-REFERENCE TO RELATED APPLICATION

The present application claims priority to Chinese Patent Application No. 2021113863396, filed on Nov. 22, 2021. The entire contents of the above-listed application are hereby incorporated by reference for all purposes.

BACKGROUND

In recent years, the Internet of Things technology has developed rapidly, and an increasing number of smart home devices have emerged in work and life. In order to meet service needs, smart home devices need to communicate with a cloud network in real time, which puts forward higher technical requirements for Internet of Things terminals to meet low power consumption and fast networking.

SUMMARY

The present disclosure relates to the technical field of communication, in particular to a device control method, a device control apparatus and a storage medium.

In order to overcome the problems existing in related art, the present disclosure provides a device control method, a device control apparatus and a storage medium.

According to a first aspect of embodiments of the present disclosure, a device control method is provided and applied to an Internet of Things device. The method includes: sending first device information to a proxy device, the first device information being device information of the Internet of Things device, and the proxy device being configured to act as proxy for the Internet of Things device to send a keep-alive message to a cloud server; obtaining second device information, the second device information being device information of the proxy device; establishing a first connection with the cloud server, and sending the device information of the proxy device to the cloud server through the first connection, so as to establish a second connection between the proxy device and the cloud server based on the first device information and the second device information, the second connection being configured to transmit the keep-alive message; and in response to determining that notification information sent by the cloud server is received, controlling the Internet of Things device to enter a low power consumption mode, the notification information being configured to indicate that the second connection has been established between the proxy device and the cloud server.

According to a second aspect of embodiments of the present disclosure, a device control method is provided and applied to a proxy device. The method includes: obtaining first device information sent by an Internet of Things device, the first device information being device information of the Internet of Things device; sending second device information to the Internet of Things device, and sending the second device information to a cloud server by the Internet of Things device based on a first connection; and establishing a second connection with the cloud server based on the first device information and the second device information, and sending a keep-alive message of the Internet of Things device to the cloud server through a second connection.

According to a third aspect of embodiments of the present disclosure, a device control method is provided and applied to a cloud server. The method includes: establishing a first connection with an Internet of Things device, and obtaining second device information of a proxy device through the first connection; obtaining first device information sent by the proxy device, and establishing a second connection with the proxy device based on the first device information and the second device information; sending notification information; sending notification information to the Internet of Things device, the notification information being configured to indicate that the second connection has been established between the proxy device and the cloud server; and receiving a keep-alive message sent by the proxy device through the second connection.

According to a fourth aspect of embodiments of the present disclosure, a device control apparatus is provided, including: a processor; and a memory configured to store processor-executable instructions. The processor is configured to: execute any above-mentioned device control method.

According to a fifth aspect of embodiments of the present disclosure, a non-temporary computer-readable storage medium is provided. Instructions in the storage medium, when executed by a processor of a mobile terminal, cause the mobile terminal to execute any above-mentioned device control method.

It should be understood that the above general descriptions and later detailed descriptions are merely exemplary and illustrative, and cannot limit the present disclosure.

BRIEF DESCRIPTION OF THE FIGURES

The accompanying drawings herein are incorporated into the specification and constitute a part of the specification, show embodiments consistent with the present disclosure, and together with the specification are used to explain the principle of the present disclosure.

DETAILED DESCRIPTION

Examples will be described in detail here, and instances thereof are shown in the accompanying drawings. When the following description refers to the accompanying drawings, unless otherwise indicated, the same numbers in different drawings indicate the same or similar elements. The implementations described in the following examples do not represent all implementations consistent with the present disclosure. Rather, they are merely examples of apparatuses and methods consistent with some aspects of the present disclosure as detailed in the appended claims.

In recent years, the Internet of Things technology has developed rapidly, and an increasing number of smart home devices have emerged in work and life. In order to meet service needs, smart home devices need to communicate with a cloud network in real time, which puts forward higher technical requirements for Internet of Things terminals to meet low power consumption and fast networking.

In order to maintain the network connection, Internet of Things devices in the Internet of Things need to communicate with a cloud server in real time through a keep-alive mechanism, by sending keep-alive packets, and receiving response from the cloud server. The Internet of Things devices need to be woken up periodically and interact with the cloud server frequently, so as to implement the keep-alive mechanism.

In order to maintain a real-time connection with a cloud server, and further to maintain networking and wake up the Internet of Things terminals remotely, smart home devices need to maintain a real-time connection with the cloud server through keep-alive messages, and periodically interact with the cloud server. When the smart home devices are kept on standby, a chip is subjected to frequent interaction and wakeup due to transmission of the keep-alive messages, which results in sacrifice of the low power consumption of the chip. For some devices that use built-in batteries due to limitation from usage conditions, the power consumption problem affects user experience significantly.

Figure 1:
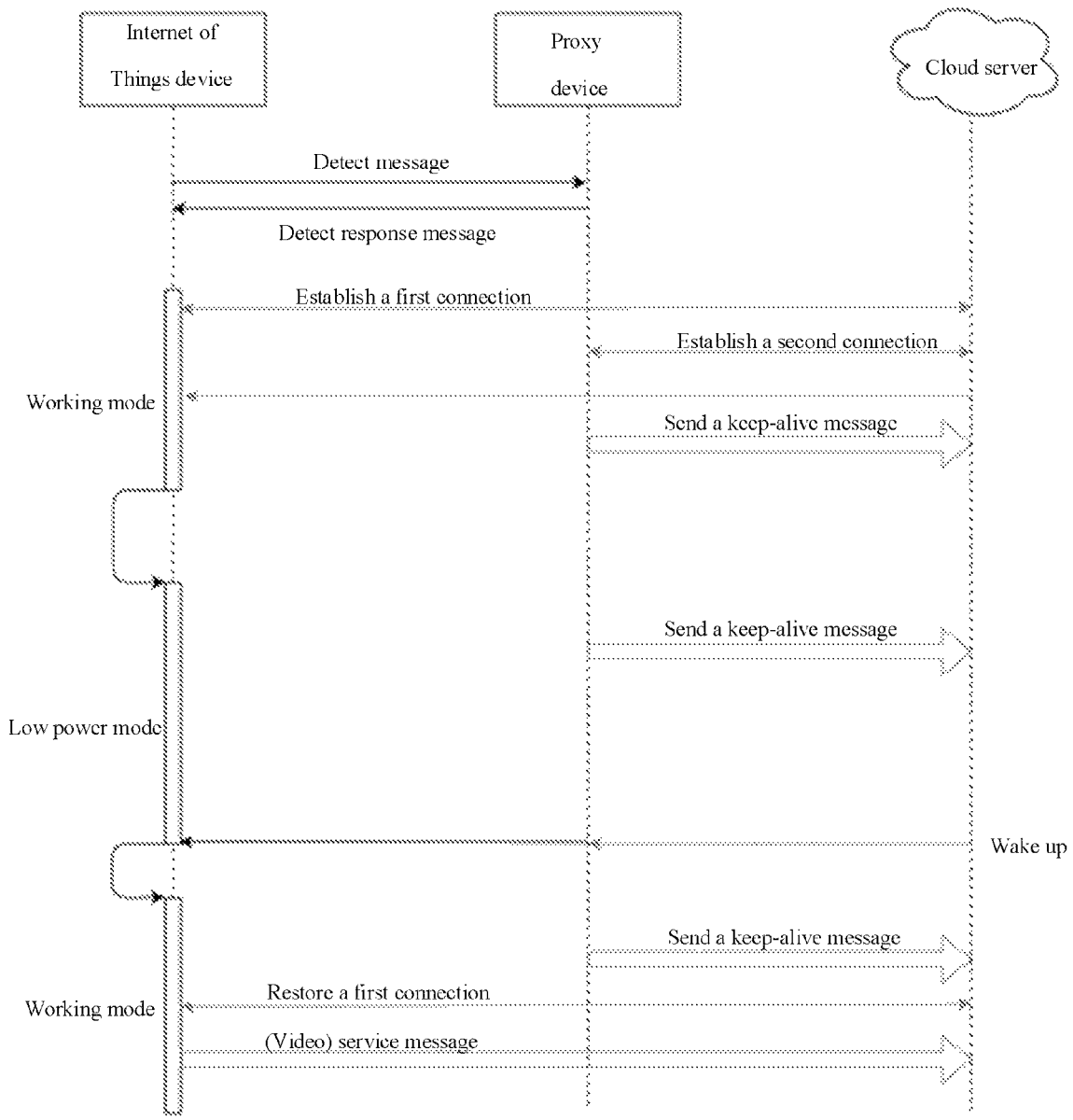
FIG. 1 shows a schematic diagram of interaction among an Internet of Things device, a proxy device and a cloud server in the prior art.

FIG. 1 shows a schematic diagram of interaction among an Internet of Things device, a proxy device and a cloud server in the related art. Referring to FIG. 1, after the Internet of Things device is connected to a network, a secure connection with the cloud server is established, keep-alive information is sent to the cloud server, the Internet of Things device enters a low power consumption mode and still periodically sends the keep-alive information, and consequently a chip of the Internet of Things device is frequently woken up due to the transmission of the keep-alive information, and the power consumption is increased. When a user checks an application of the Internet of Things device, the cloud server sends wake-up information to the Internet of Things device to make it enter a working mode. In the working mode of the Internet of Things device, the Internet of Things device sends video and other service messages to the cloud server, and periodically sends the keep-alive information to the cloud server. The Internet of Things device is in a low power consumption state when it is in standby, but frequent wake-up increases the power consumption of the Internet of Things device in the low power consumption state, speeds up power consumption, and reduces the battery life of the device.

For some Internet of Things devices, due to factors such as the production process and the use environment, a power adapter cannot be used, and only a battery is adopted for power supply. The power consumption of the device is one factor affecting the user experience.

Therefore, the present disclosure provides a device control method, a proxy device replaces an Internet of Things device to connect to a cloud server in real time, and the proxy device acts as a proxy to handle a keep-alive service of the Internet of Things device, thereby reducing frequent wake-up of the Internet of Things device, and accordingly, the power consumption of the Internet of Things device is reduced.

Figure 2:
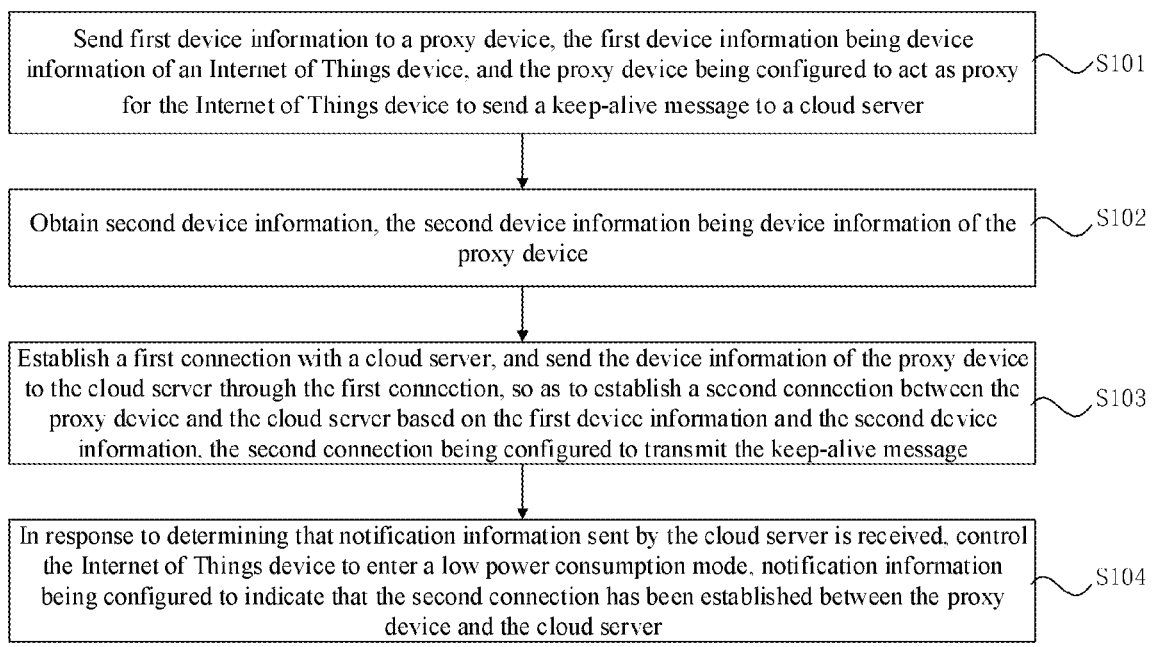
FIG. 2 is a flow diagram of a device control method according to an example of the present disclosure.

FIG. 2 is a flow diagram of a device control method according to an example of the present disclosure, and the device control method is applied to an Internet of Things device. As shown in FIG. 2, the device control method includes the following steps.

In step S101, first device information is sent to a proxy device, the first device information being device information of the Internet of Things device, and the proxy device being configured to act as proxy for the Internet of Things device to send a keep-alive message to a cloud server.

In step S102, second device information is obtained, the second device information being device information of the proxy device.

In step S103, a first connection is established with the cloud server, device information of the proxy device is sent to the cloud server through the first connection, so as to establish a second connection between the proxy device and the cloud server based on the first device information and the second device information, the second connection being configured to transmit the keep-alive message.

In step S104, in response to determining that notification information sent by the cloud server is received, the Internet of Things device is controlled to enter a low power consumption mode, the notification information being configured to indicate that the second connection has been established between the proxy device and the cloud server.

In the embodiment of the present disclosure, the Internet of Things device may be any smart device in the Internet of Things, such as a smart home device, and a smart wearable device, the proxy device may be a wireless access point (AP), and the wireless AP is an access point for a mobile computer user to enter a wired network and is also a core of the wireless network. The wireless AP may be a simple wireless access point, or may also be a device such as a wireless router.

In the embodiment of the present disclosure, the proxy device acts as proxy for the Internet of Things device to send the keep-alive message to the cloud server. The keep-alive message may also be called a heartbeat packet. It may be understood that a heartbeat generally means that one end of communication parties sends a custom command to the other end to determine whether both parties are alive, and the keep-alive message may be sent periodically, similar to the heartbeat, so it may also be called a heartbeat command.

The Internet of Things device sends its own device information, that is, the first device information, to the proxy device, so that the proxy device performs identity authentication according to the received device information of the Internet of Things device. In the embodiment of the present disclosure, the Internet of Things device may query whether the connected proxy device supports a proxy keep-alive function through a detection message, and send the first device information through the detection message. The Internet of Things device obtains the device information of the proxy device, that is, the second device information, so that the Internet of Things device performs identity authentication according to the device information of the proxy device, prevents access to an illegal proxy device, and ensures the secure communication between the Internet of Things device and the proxy device. When the proxy device supports the proxy keep-alive function, the second device information may be sent through a detect response message. The first connection is established between the Internet of Things device and the cloud server, and the device information of the proxy device is sent to the cloud server through the first connection, so as to establish the second connection between the proxy device and the cloud server based on the first device information and the second device information. The proxy device may perform proxying based on the second connection, and act as proxy for the Internet of Things device to transmit the keep-alive message to the cloud server. The Internet of Things device determines that the notification information sent by the cloud server is received, and the notification information indicates that the proxy device has established the second connection with the cloud server, that is, the proxy device transmits the keep-alive message and controls the Internet of Things device to enter the low power consumption mode, and the low power consumption mode is also called a sleep mode.

According to the embodiment of the present disclosure, the proxy device replaces the Internet of Things device to connect to the cloud server in real time, and the proxy device acts as proxy to handle the keep-alive service of the Internet of Things device, thereby reducing frequent wake-up of the Internet of Things device, and accordingly, the power consumption of the Internet of Things device is reduced, and user experience is improved.

Figure 3:
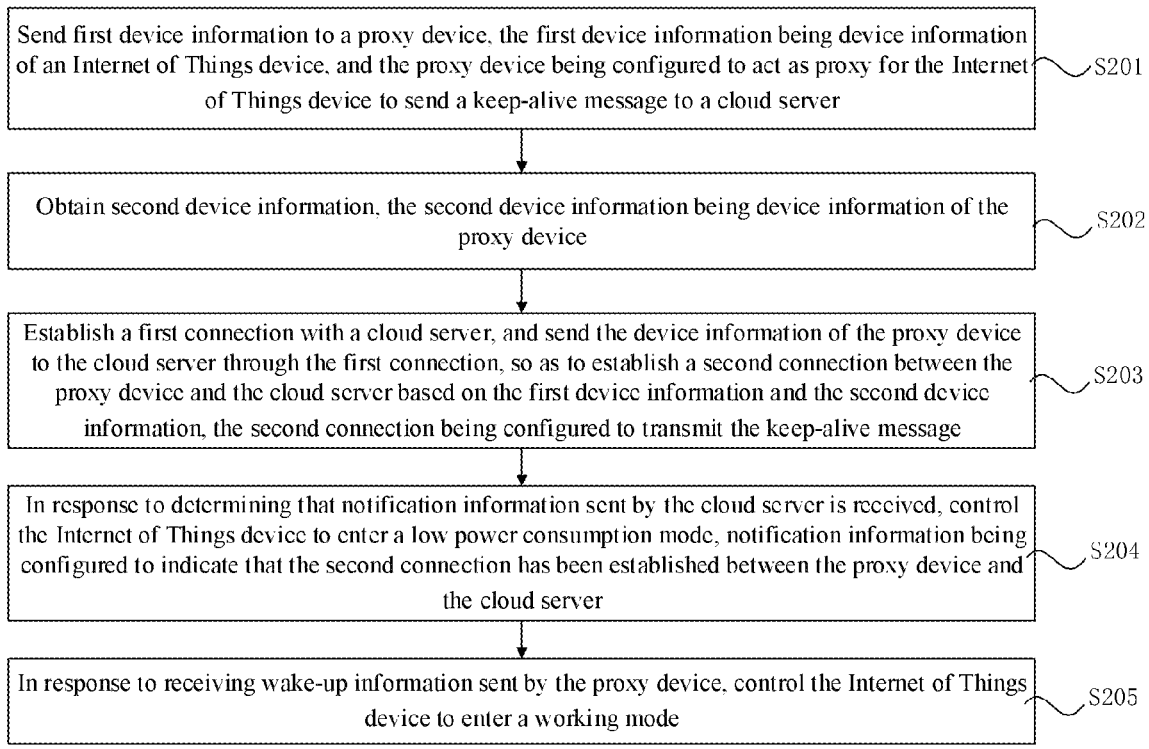
FIG. 3 is a flow diagram of a device control method according to another example of the present disclosure.

FIG. 3 is a flow diagram of a device control method according to an example of the present disclosure, and the device control method is applied to an Internet of Things device. As shown in FIG. 3, the device control method includes the following steps.

In step S201, first device information is sent to a proxy device, the first device information being device information of the Internet of Things device, and the proxy device being configured to act as proxy for the Internet of Things device to send a keep-alive message to a cloud server.

In step S202, second device information is obtained, the second device information being device information of the proxy device.

In step S203, a first connection is established with the cloud server, device information of the proxy device is sent to the cloud server through the first connection, so as to establish a second connection between the proxy device and the cloud server based on the first device information and the second device information, the second connection being configured to transmit the keep-alive message.

In step S204, in response to determining that notification information sent by the cloud server is received, the Internet of Things device is controlled to enter a low power consumption mode, the notification information being config- ured to indicate that the second connection has been established between the proxy device and the cloud server.

In step S205, in response to receiving wake-up information sent by the proxy device, the Internet of Things device is controlled to enter a working mode.

In the embodiment of the present disclosure, the proxy device acts as proxy for the Internet of Things device to send the keep-alive message to the cloud server, the Internet of Things device sends the first device information to the proxy device, that is, the device information of the Internet of Things device, and the Internet of Things device obtains the second device information, that is, the device information of the proxy device. The first connection is established between the Internet of Things device and the cloud server, and the device information of the proxy device is sent to the cloud server through the first connection, so as to establish the second connection between the proxy device and the cloud server based on the first device information and the second device information. The proxy device may perform proxying based on the second connection, and act as a proxy for the Internet of Things device to transmit the keep-alive message to the cloud server. The Internet of Things device determines that the notification information sent by the cloud server is received, and the notification information indicates that the proxy device has established the second connection with the cloud server, that is, the proxy device transmits the keep-alive message and controls the Internet of Things device to enter the low power consumption mode. When the user checks the Internet of Things device by operating an application for Internet of Things device management, the cloud server transmits the wake-up information to the proxy device through the second connection with the proxy device, the proxy device sends the wake-up information to the Internet of Things device, and after receiving the wake-up information, the Internet of Things device enters the working mode from the low power consumption mode to perform services such as video transmission. It may be understood that the power consumption of the low power consumption mode of the Internet of Things device is lower than that of the working mode thereof.

According to the embodiment of the present disclosure, the proxy device acts as proxy to handle the keep-alive service of the Internet of Things device, thereby reducing frequent wake-up of the Internet of Things device, and accordingly, the power consumption of the Internet of Things device is reduced, and when the wake-up information is received, the Internet of Things device enters the working mode, and reasonable and effective control over the Internet of Things device is achieved.

Figure 4:
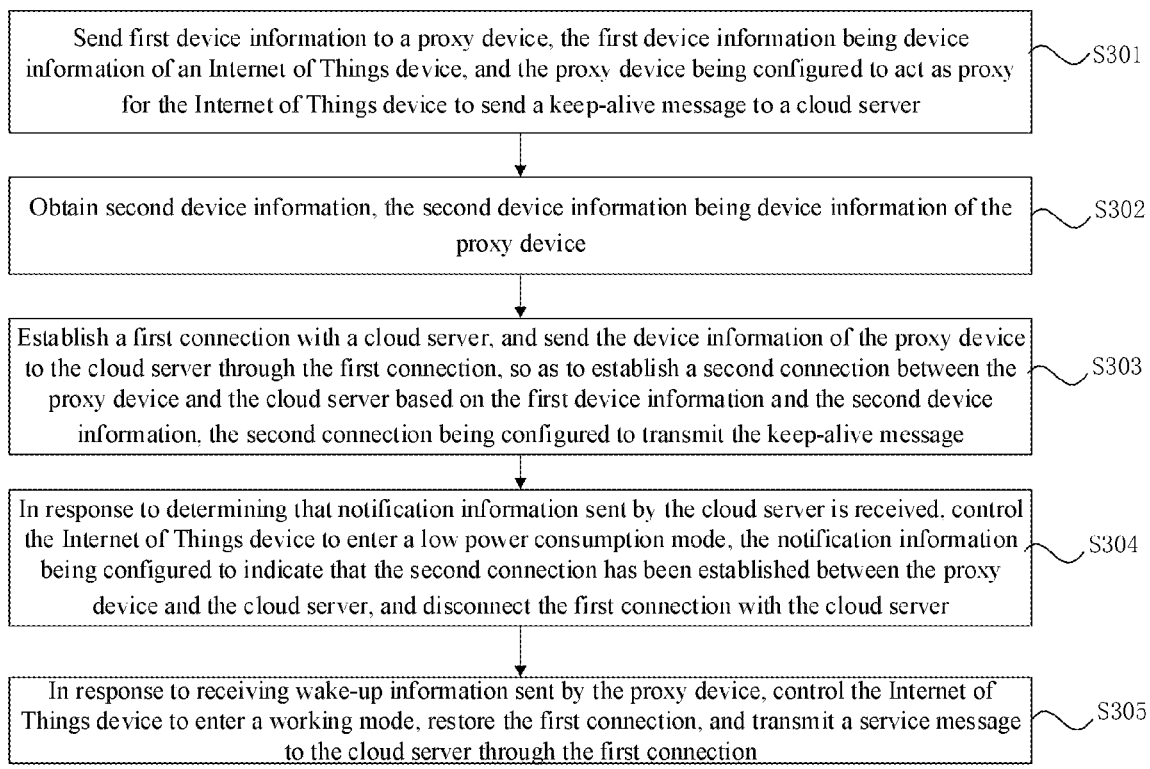
FIG. 4 is a flow diagram of a device control method according to another example of the present disclosure.

FIG. 4 is a flow diagram of a device control method according to an example of the present disclosure, and the device control method is applied to an Internet of Things device. As shown in FIG. 4, the device control method includes the following steps.

In step S301, first device information is sent to a proxy device, the first device information being device information of the Internet of Things device, and the proxy device being configured to act as proxy for the Internet of Things device to send a keep-alive message to a cloud server.

In step S302, second device information is obtained, the second device information being device information of the proxy device.

In step S303, a first connection is established with the cloud server, device information of the proxy device is sent to the cloud server through the first connection, so as to establish a second connection between the proxy device and the cloud server based on the first device information and the second device information, the second connection being configured to transmit the keep-alive message.

In step S304, in response to determining that notification information sent by the cloud server is received, the Internet of Things device is controlled to enter a low power consumption mode, the notification information being configured to indicate that the second connection has been established between the proxy device and the cloud server, and the first connection with the cloud server is disconnected.

In step S305, in response to receiving wake-up information sent by the proxy device, the Internet of Things device is controlled to enter a working mode, the first connection is restored, and a service message is transmitted to the cloud server through the first connection.

In the embodiment of the present disclosure, the proxy device acts as proxy for the Internet of Things device to transmit the keep-alive message to the cloud server, the first connection is established between the Internet of Things device and the cloud server, and the proxy device may act as proxy based on the second connection for the Internet of Things device to transmit the keep-alive message to the cloud server. The Internet of Things device determines that the notification information sent by the cloud server is received, and the notification information indicates that the proxy device has established the second connection with the cloud server, that is, the proxy device transmits the keep-alive message and controls the Internet of Things device to enter the low power consumption mode, and the first connection with the cloud server is disconnected. After the Internet of Things device receives the wake-up information, the Internet of Things device enters the working mode from the low power consumption mode, the first connection is restored, and services such as video transmission are performed.

According to the embodiment of the present disclosure, the proxy device acts as proxy to handle the keep-alive service of the Internet of Things device, the Internet of Things device enters the low power consumption mode, and disconnects the first connection with the cloud server under the low power consumption mode, so that the power consumption of the Internet of Things device is further reduced, and when the Internet of Things device enters the working mode, the first connection is restored, the service message is transmitted to the cloud server through the first connection, and control over the Internet of Things device is ensured.

In some embodiments, the notification information includes local communication key negotiation information of the proxy device, the proxy device and the Internet of Things device interact with each other through secure channels established respectively with the cloud server, so as to share the information required for the key negotiation based on the local communication key negotiation information to establish an encrypted channel, and the proxy device and the Internet of Things device achieve information transmission based on the encrypted channel. The notification information further includes an authentication result of the proxy device by the cloud server, and the Internet of Things device authenticates the proxy device, and prevents access to an illegal proxy device. The Internet of Things device authenticates the proxy device through the cloud server, establishes a secure connection with the cloud server, and sends the information of the proxy device to the cloud server, and the cloud server notifies the Internet of Things device of the authentication result of the proxy device.

According to the embodiment of the present disclosure, the proxy device acts as proxy to handle the keep-alive service of the Internet of Things device, the Internet of Things device and the proxy device separately use the cloud server to authenticate the identity of the other device, and establish a secure channel for communication therebetween to ensure that safe and effective information transmission between the Internet of Things device and the proxy device.

Figure 5:
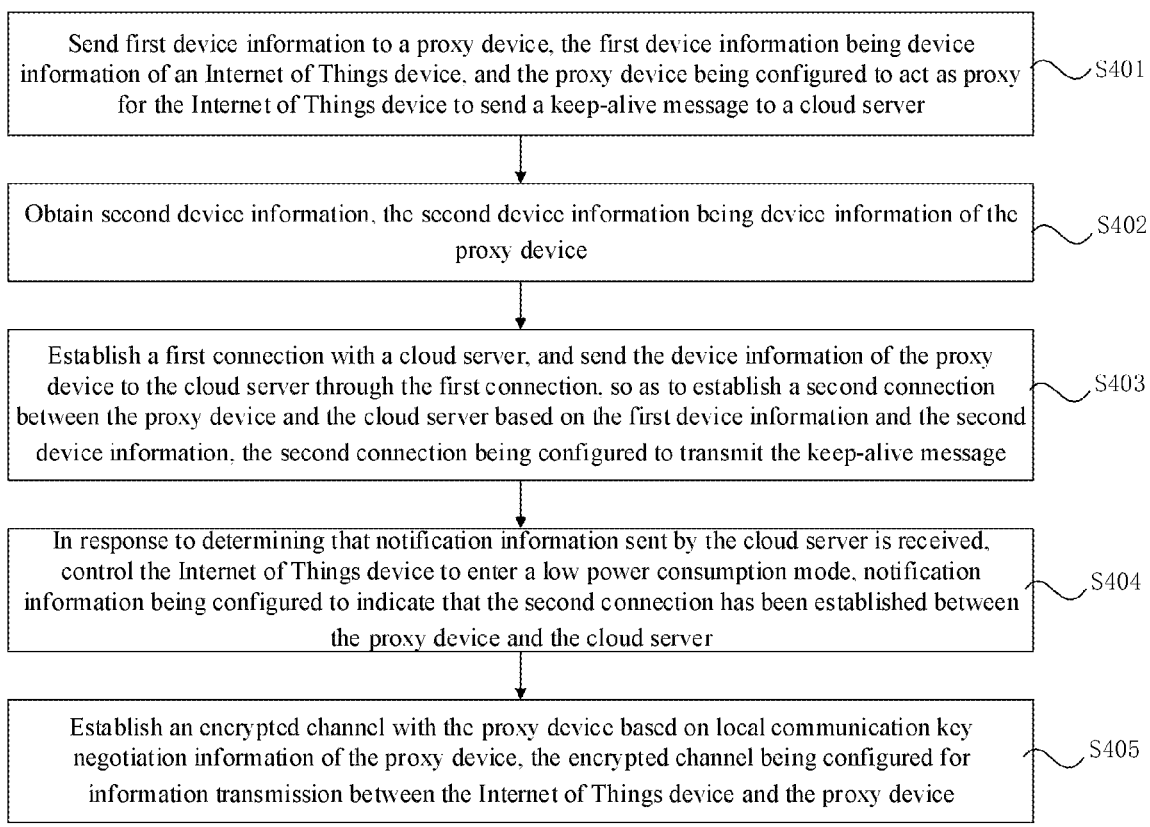
FIG. 5 is a flow diagram of a device control method according to another example of the present disclosure.

FIG. 5 is a flow diagram of a device control method according to another example of the present disclosure, and the device control method is applied to an Internet of Things device. As shown in FIG. 5, the device control method includes the following steps.

In step S401, first device information is sent to a proxy device, the first device information being device information of the Internet of Things device, and the proxy device being configured to act as proxy for the Internet of Things device to send a keep-alive message to a cloud server.

In step S402, second device information is obtained, the second device information being device information of the proxy device.

In step S403, a first connection is established with the cloud server, the device information of the proxy device is sent to the cloud server through the first connection, so as to establish a second connection between the proxy device and the cloud server based on the first device information and the second device information, the second connection being configured to transmit the keep-alive message.

In step S404, in response to determining that notification information sent by the cloud server is received, the Internet of Things device is controlled to enter a low power consumption mode, the notification information being configured to indicate that the second connection has been established between the proxy device and the cloud server.

In step S405, an encrypted channel is established with the proxy device based on local communication key negotiation information of the proxy device, the encrypted channel being configured for information transmission between the Internet of Things device and the proxy device.

In some embodiments, the notification information includes the local communication key negotiation information of the proxy device, the second connection is established between the proxy device and the cloud server based on the first device information and the second device information, the local communication key negotiation information is carried, and the local communication key negotiation information is sent to the cloud server, so as to realize the transmission of the local communication key negotiation information to the Internet of Things device through the cloud server. The proxy device and the Internet of Things device interact through secure channels established respectively with the cloud server, so that the Internet of Things device and the proxy device share the information required for the key negotiation based on the local communication key negotiation information to establish the encrypted channel, and the proxy device and the Internet of Things device achieve information transmission based on the encrypted channel.

According to the embodiment of the present disclosure, the proxy device acts as proxy to handle the keep-alive service of the Internet of Things device, the Internet of Things device and the proxy device separately use the cloud server to authenticate the identity of the other device, and establish a secure channel for communication between the Internet of Things device and the proxy device to ensure that safe and effective information transmission between the Internet of Things device and the proxy device.

Figure 6:
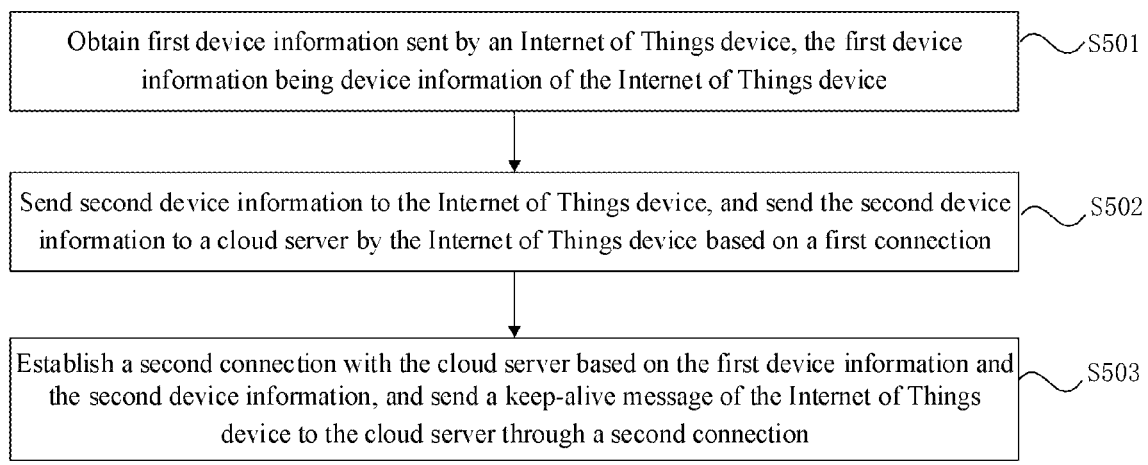
FIG. 6 is a flow diagram of a device control method according to another example of the present disclosure.

FIG. 6 is a flow diagram of a device control method according to another example of the present disclosure, and the device control method is applied to a proxy device. As shown in FIG. 6, the device control method includes the following steps.

In step S501, first device information sent by an Internet of Things device is obtained, the first device information being device information of the Internet of Things device.

In step S502, second device information is sent to the Internet of Things device, and the second device information is sent to a cloud server by the Internet of Things device based on a first connection.

In step S503, a second connection is established with the cloud server based on the first device information and the second device information, and a keep-alive message of the Internet of Things device is sent to the cloud server through the second connection.

In the embodiment of the present disclosure, the proxy device acts as proxy for the Internet of Things device to send the keep-alive message to the cloud server, and the Internet of Things device sends the device information of the Internet of Things device to the proxy device, that is, the first device information, so that the proxy device performs identity authentication according to the received device information of the Internet of Things device.

In the embodiment of the present disclosure, the Internet of Things device may query whether the connected proxy device supports a proxy keep-alive function through a detection message, and send the first device information through the detection message. The Internet of Things device obtains the device information of the proxy device, that is, the second device information, so that the Internet of Things device performs identity authentication according to the device information of the proxy device, prevents access to an illegal proxy device, and ensures the secure communication between the Internet of Things device and the proxy device. When the proxy device supports the proxy keep-alive function, the second device information may be sent through a detect response message. The first connection is established between the Internet of Things device and the cloud server, and the device information of the proxy device is sent to the cloud server through the first connection. The proxy device establishes the second connection with the cloud server based on the first device information and the second device information, and replaces the Internet of Things device to send the keep-alive message to the cloud server through the second connection. The proxy device transmits the keep-alive message, and the Internet of Things device may enter a low power consumption mode, so that the power consumption of the Internet of Things device is reduced.

According to the embodiment of the present disclosure, the proxy device replaces the Internet of Things device to connect to the cloud server in real time, and the proxy device acts as proxy to handle the keep-alive service of the Internet of Things device, thereby reducing frequent wake-up of the Internet of Things device, and accordingly, the power consumption of the Internet of Things device is reduced, and the user experience is improved.

Figure 7:
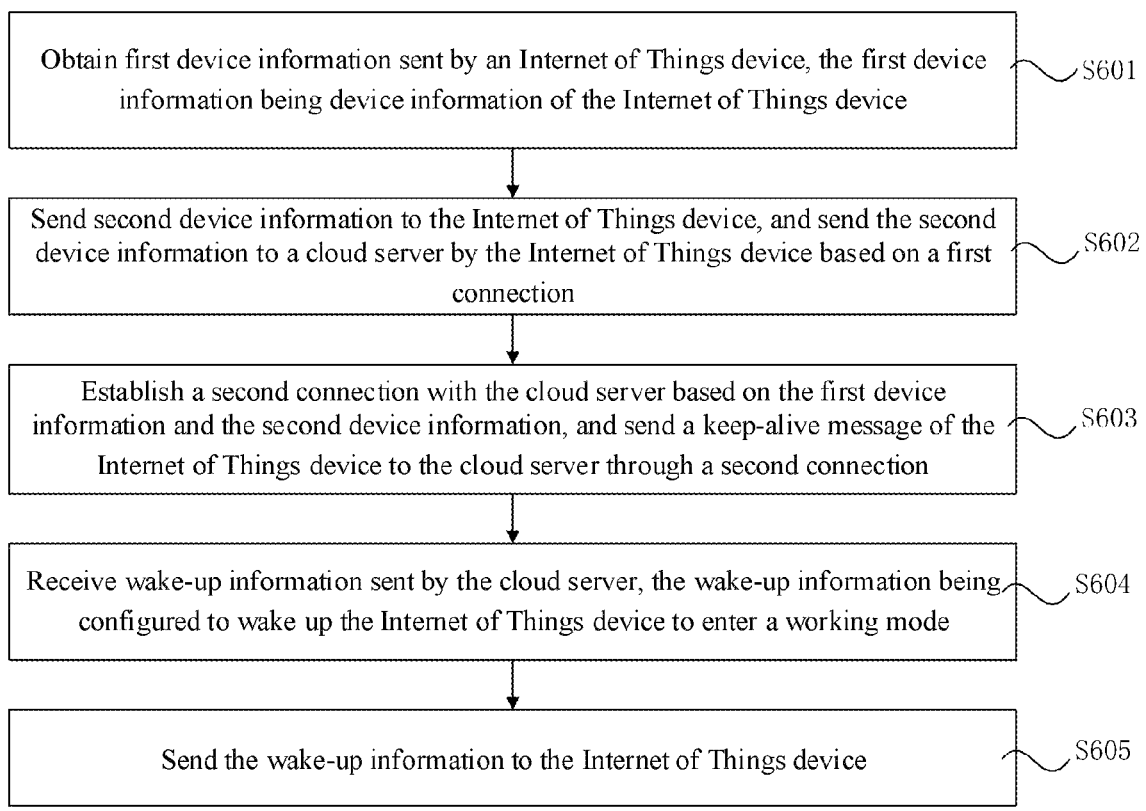
FIG. 7 is a flow diagram of a device control method according to another example of the present disclosure.

FIG. 7 is a flow diagram of a device control method according to another example of the present disclosure. As shown in FIG. 7, the device control method includes the following steps.

In step S601, first device information sent by an Internet of Things device is obtained, the first device information being device information of the Internet of Things device.

In step S602, second device information is sent to the Internet of Things device, and the second device information is sent to a cloud server by the Internet of Things device based on a first connection.

In step S603, a second connection is established with the cloud server based on the first device information and the second device information, and a keep-alive message of the Internet of Things device is sent to the cloud server through the second connection.

In step S604, wake-up information sent by the cloud server is received, the wake-up information being configured to wake up the Internet of Things device to enter a working mode.

In step S605, the wake-up information is sent to the Internet of Things device.

In the embodiment of the present disclosure, a proxy device acts as proxy for the Internet of Things device to send the keep-alive message to the cloud server, the proxy device obtains the device information sent by the Internet of Things device, that is, the first device information, and sends the device information, that is, the second device information to the Internet of Things device, and the Internet of Things device sends the second device information to the cloud server and authenticates the information of the proxy device on the cloud server. The proxy device establishes the second connection with the cloud server based on the first device information and the second device information, and replaces the Internet of Things device to send the keep-alive message to the cloud server through the second connection, so that the Internet of Things device may enter a low power consumption mode, thereby reducing the power consumption of the Internet of Things device.

In one embodiment, when the user checks the Internet of Things device by operating an application for Internet of Things device management, the cloud server transmits the wake-up information to the proxy device through the second connection with the proxy device, so as to wake up the Internet of Things device to enter the working mode. The proxy device sends the wake-up information to the Internet of Things device, and after the Internet of Things device receives the wake-up information, the Internet of Things device enters the working mode from the low power consumption mode, and services such as video transmission are performed. It may be understood that the power consumption of the low power consumption mode of the Internet of Things device is lower than that of the working mode thereof.

According to the embodiment of the present disclosure, the proxy device acts as proxy to handle the keep-alive service of the Internet of Things device, thereby reducing frequent wake-up of the Internet of Things device, and accordingly, the power consumption of the Internet of Things device is reduced, and when the wake-up information is received, the Internet of Things device enters the working mode, and reasonable and effective control over the Internet of Things device is achieved.

Figure 8:
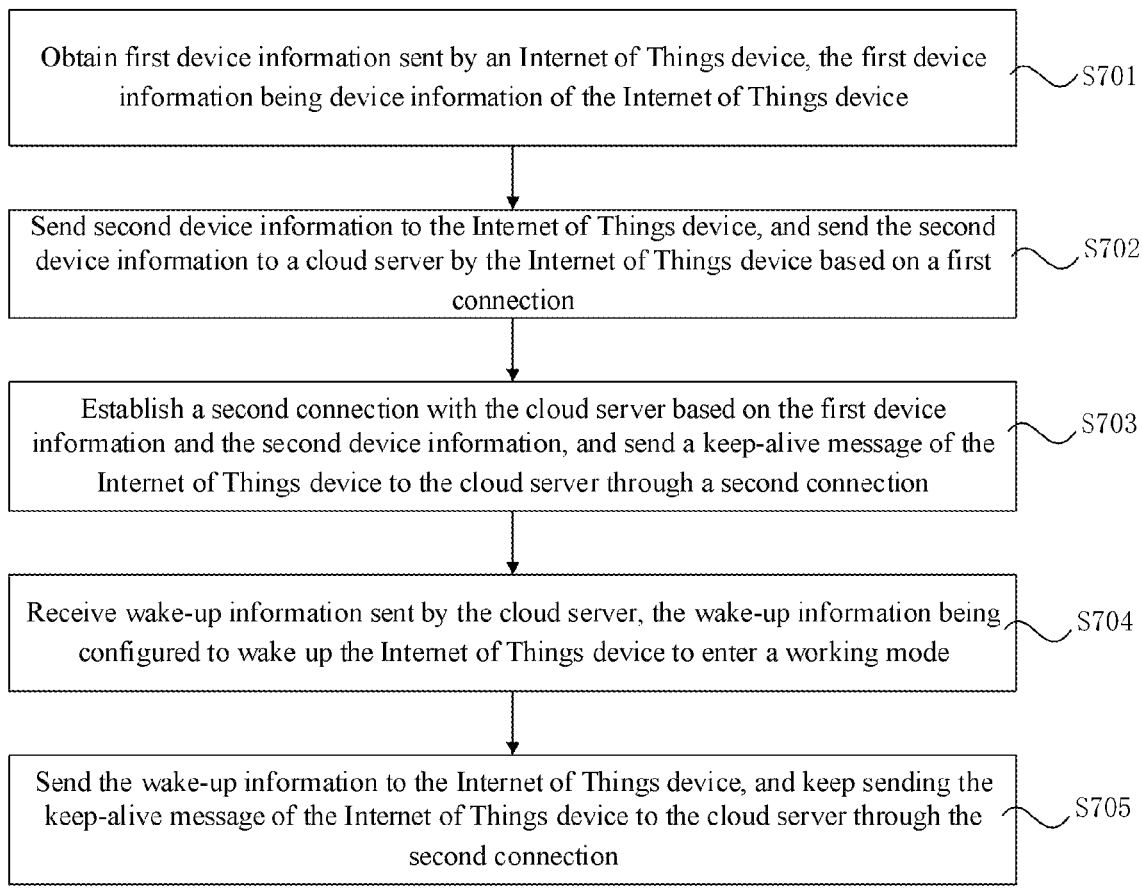
FIG. 8 is a flow diagram of a device control method according to another example of the present disclosure.

FIG. 8 is a flow diagram of a device control method according to another example of the present disclosure. As shown in FIG. 8, the device control method includes the following steps.

In step S701, first device information sent by an Internet of Things device is obtained, the first device information being device information of the Internet of Things device.

In step S702, second device information is sent to the Internet of Things device, and the second device information is sent to a cloud server by the Internet of Things device based on a first connection.

In step S703, a second connection is established with the cloud server based on the first device information and the second device information, and a keep-alive message of the Internet of Things device is sent to the cloud server through the second connection.

In step S704, wake-up information sent by the cloud server is received, the wake-up information being configured to wake up the Internet of Things device to enter a working mode.

In step S705, the wake-up information is sent to the Internet of Things device, and sending the keep-alive message of the Internet of Things device to the cloud server through second connection is kept.

In the embodiment of the present disclosure, a proxy device establishes the second connection with the cloud server based on the first device information and the second device information, and replaces the Internet of Things device to send the keep-alive message to the cloud server through the second connection, so that the Internet of Things device may enter a low power consumption mode, thereby reducing the power consumption of the Internet of Things device. The cloud server transmits the wake-up information to the proxy device through the second connection with the proxy device, so as to wake up the Internet of Things device to enter the working mode. The proxy device sends the wake-up information to the Internet of Things device, and after the Internet of Things device receives the wake-up information, the Internet of Things device enters the working mode from the low power consumption mode, and services such as video transmission are performed. The keep-alive message of the Internet of Things device is sent through the second connection between the proxy device and the cloud server, and the proxy device acts as proxy to perform the keep-alive service.

According to the embodiment of the present disclosure, the proxy device acts as proxy to handle the keep-alive service of the Internet of Things device, thereby reducing frequent wake-up of the Internet of Things device, and accordingly, the power consumption of the Internet of Things device is reduced, the Internet of Things device and the proxy device establish secure connections with the cloud server respectively, and the keep-alive service between the Internet of Things device and the cloud server is achieved simply and efficiently.

Figure 9:
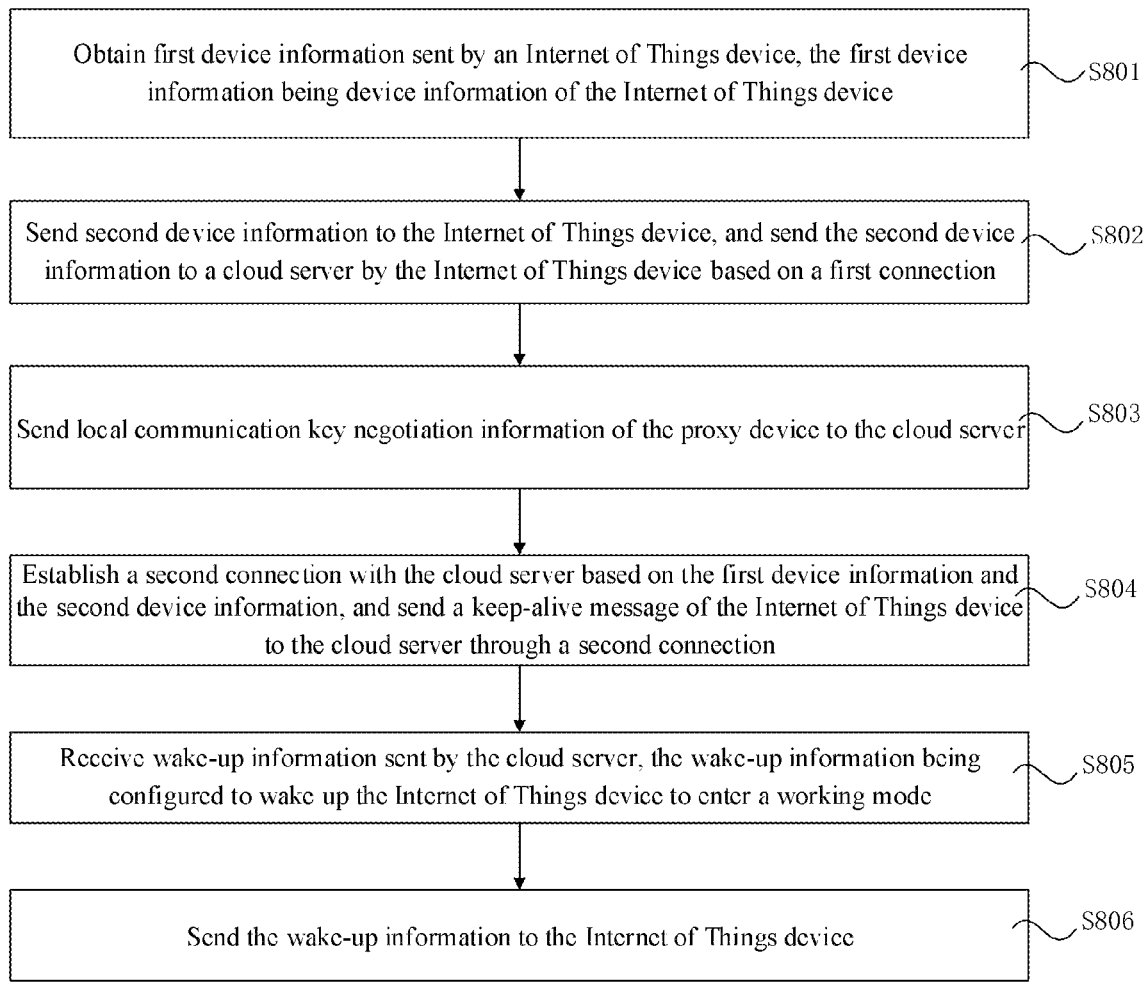
FIG. 9 is a flow diagram of a device control method according to another example of the present disclosure.

FIG. 9 is a flow diagram of a device control method according to another example of the present disclosure. As shown in FIG. 9, the device control method includes the following steps.

In step S801, first device information sent by an Internet of Things device is obtained, the first device information being device information of the Internet of Things device.

In step S802, second device information is sent to the Internet of Things device, and the second device information is sent to a cloud server by the Internet of Things device based on a first connection.

In step S803, local communication key negotiation information of a proxy device is sent to the cloud server.

In step S804, a second connection is established with the cloud server based on the first device information and the second device information, and a keep-alive message of the Internet of Things device is sent to the cloud server through the second connection.

In step S805, wake-up information sent by the cloud server is received, the wake-up information being configured to wake up the Internet of Things device to enter a working mode.

In step S806, the wake-up information is sent to the Internet of Things device.

In the embodiment of the present disclosure, the proxy device sends the local communication key negotiation information of the proxy device to the cloud server, and the proxy device and the Internet of Things device interact through the secure channels established respectively with the cloud server, so that the Internet of Things device and the proxy device share the information required for the key negotiation based on the local communication key negotiation information to establish an encrypted channel.

The cloud server authenticates the proxy device and the Internet of Things device respectively, and sends an authentication result to the Internet of Things device and the proxy device, and the Internet of Things device prevents access to an illegal proxy device. The authenticated proxy device establishes the second connection with the cloud server based on the first device information and the second device information, and replaces the Internet of Things device to send the keep-alive message to the cloud server through the second connection, so that the Internet of Things device may enter a low power consumption mode, thereby reducing the power consumption of the Internet of Things device.

According to the embodiment of the present disclosure, the proxy device acts as proxy to handle the keep-alive service of the Internet of Things device, the Internet of Things device and the proxy device separately use the cloud server to authenticate the identity of the other device, and establish a secure channel for communication therebetween to ensure that safe and effective information transmission between the Internet of Things device and the proxy device.

Figure 10:
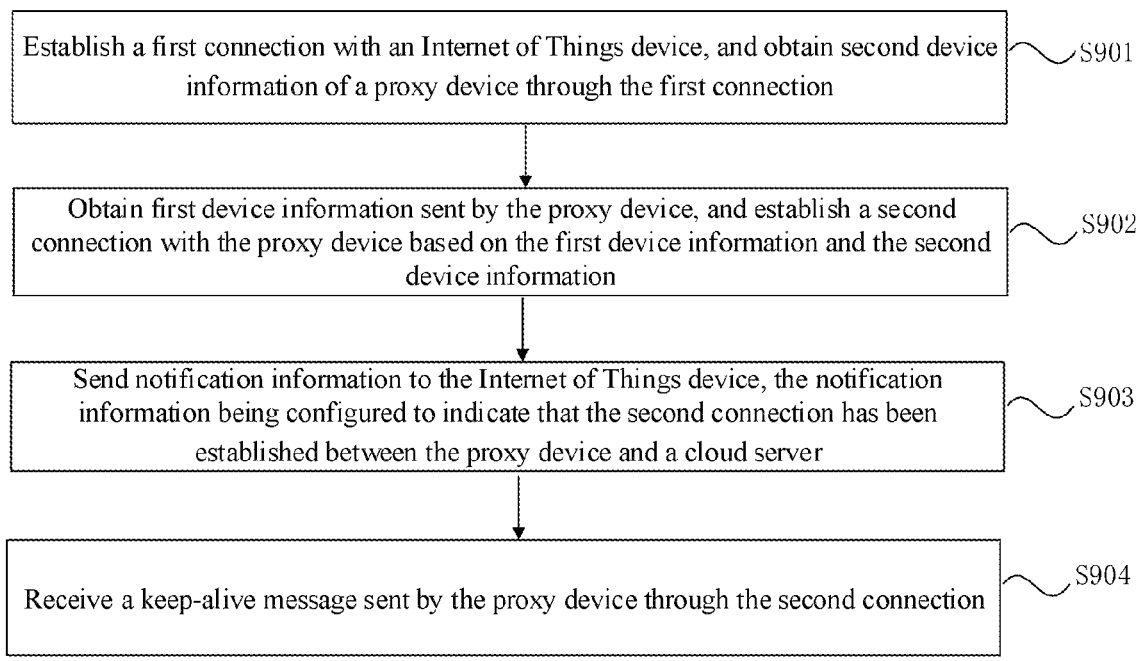
FIG. 10 is a flow diagram of a device control method according to an example of the present disclosure.

FIG. 10 is a flow diagram of a device control method according to another example of the present disclosure, and the device control method is applied to a cloud server. As shown in FIG. 10, the device control method includes the following steps.

In step S901, a first connection is established with an Internet of Things device, and second device information of a proxy device is obtained through the first connection.

In step S902, first device information sent by the proxy device is obtained, and a second connection is established with the proxy device based on the first device information and the second device information.

In step S903, notification information is sent to the Internet of Things device, the notification information being configured to indicate that the second connection has been established between the proxy device and the cloud server.

In step S904, a keep-alive message sent by the proxy device is received through the second connection.

In the embodiment of the present disclosure, the first connection is established between the cloud server and the Internet of Things device, and the Internet of Things device sends the second device information of the proxy device to the cloud server through the first connection, so as to achieve authentication of the proxy device through the cloud server. The cloud server obtains the first device information sent by the proxy device, that is, the information of the Internet of Things device, the second connection is established with the proxy device based on the first device information and the second device information, and the proxy device replaces the Internet of Things device to send the keep-alive message to the cloud server through the second connection.

According to the embodiment of the present disclosure, the proxy device replaces the Internet of Things device to connect to the cloud server in real time, and the proxy device acts as proxy to handle the keep-alive service of the Internet of Things device, thereby reducing frequent wake-up of the Internet of Things device, and accordingly, the power consumption of the Internet of Things device is reduced, and the user experience is improved.

Figure 11:
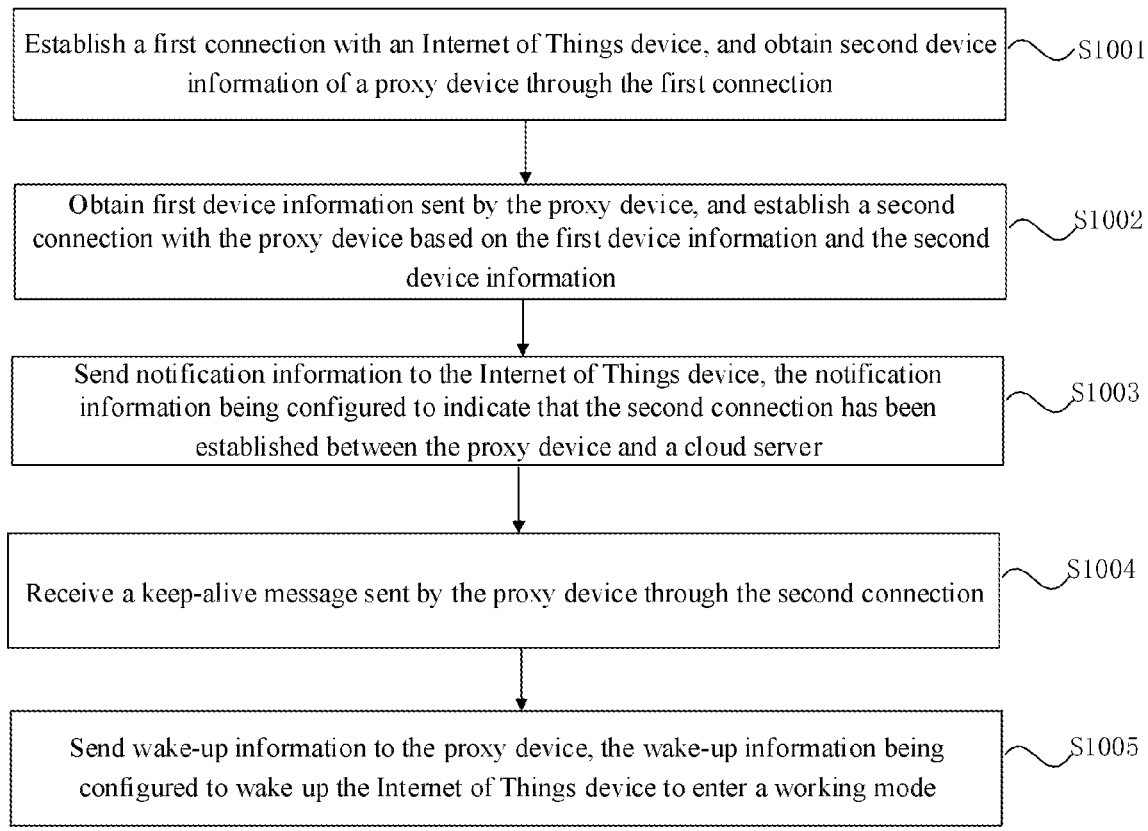
FIG. 11 is a flow diagram of a device control method according to another example of the present disclosure.

FIG. 11 is a flow diagram of a device control method according to another example of the present disclosure. As shown in FIG. 11, the device control method includes the following steps.

In step S1001, a first connection is established with an Internet of Things device, and second device information of a proxy device is obtained through the first connection.

In step S1002, first device information sent by the proxy device is obtained, and a second connection is established with the proxy device based on the first device information and the second device information.

In step S1003, notification information is sent to the Internet of Things device, the notification information being configured to indicate that the second connection has been established between the proxy device and a cloud server.

In step S1004, a keep-alive message sent by the proxy device is received through the second connection.

In step S1005, wake-up information is sent to the proxy device, the wake-up information being configured to wake up the Internet of Things device to enter a working mode.

In the embodiment of the present disclosure, the first connection is established between the cloud server and the Internet of Things device, and the Internet of Things device sends the second device information of the proxy device to the cloud server through the first connection, so as to achieve authentication of the proxy device through the cloud server. The cloud server obtains the first device information sent by the proxy device, that is, the information of the Internet of Things device, the second connection is established with the proxy device based on the first device information and the second device information, and the proxy device replaces the Internet of Things device to send the keep-alive message to the cloud server through the second connection.

In the embodiment of the present disclosure, when the user checks the Internet of Things device by operating an application for Internet of Things device management, the cloud server transmits the wake-up information to the proxy device through the second connection with the proxy device, so as to wake up the Internet of Things device to enter the working mode. The proxy device sends the wake-up information to the Internet of Things device, and after the Internet of Things device receives the wake-up information, the Internet of Things device enters the working mode from a low power consumption mode, and services such as video transmission are performed.

According to the embodiment of the present disclosure, the proxy device acts as proxy to handle the keep-alive service of the Internet of Things device, thereby reducing frequent wake-up of the Internet of Things device, and accordingly, the power consumption of the Internet of Things device is reduced, and when the wake-up information is received, the Internet of Things device enters the working mode, and reasonable and effective control over the Internet of Things device is achieved.

Figure 12:
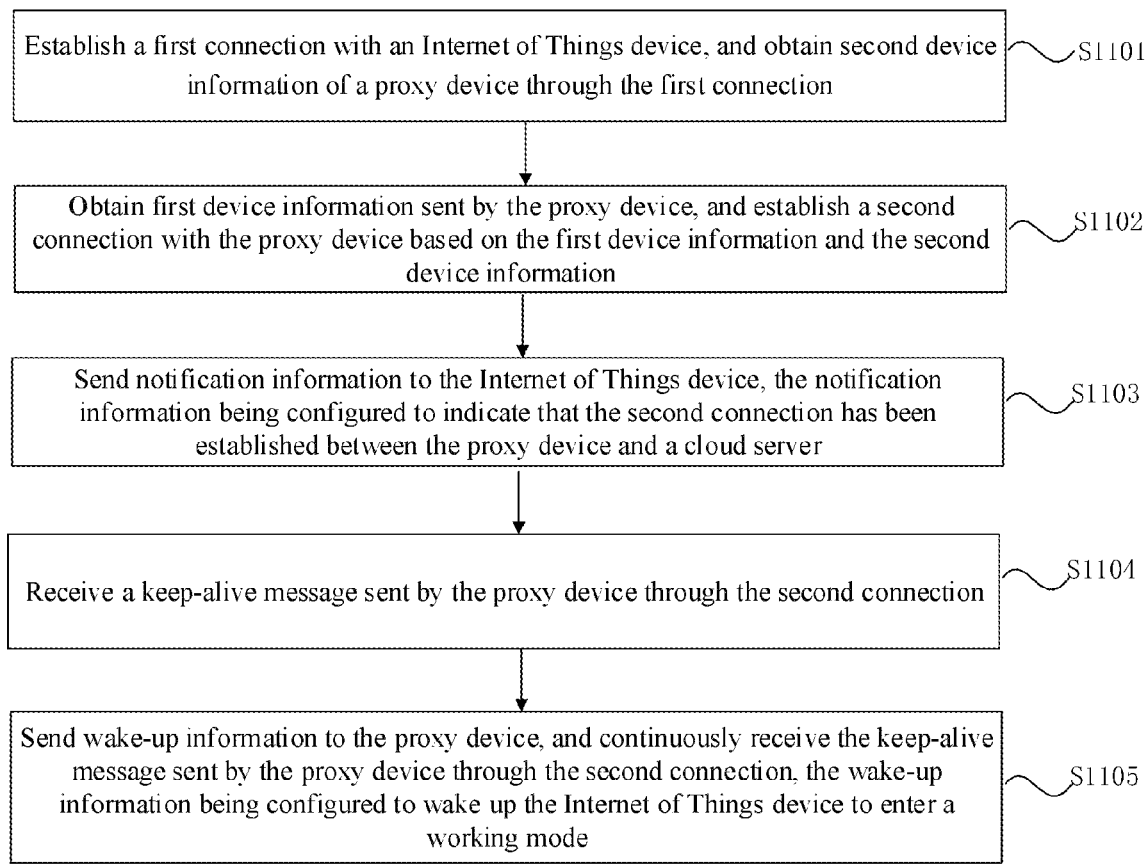
FIG. 12 is a flow diagram of a device control method according to another example of the present disclosure.

FIG. 12 is a flow diagram of a device control method according to another example of the present disclosure. As shown in FIG. 12, the device control method includes the following steps.

In step S1101, a first connection is established with an Internet of Things device, and second device information of a proxy device is obtained through the first connection.

In step S1102, first device information sent by the proxy device is obtained, and a second connection is established with the proxy device based on the first device information and the second device information.

In step S1103, notification information is sent to the Internet of Things device, the notification information being configured to indicate that the second connection has been established between the proxy device and a cloud server.

In step S1104, a keep-alive message sent by the proxy device is received through the second connection.

In step S1105, wake-up information is sent to the proxy device, and the keep-alive message sent by the proxy device is continuously received through the second connection, the wake-up information being configured to wake up the Internet of Things device to enter a working mode.

In the embodiment of the present disclosure, the first connection is established between the cloud server and the Internet of Things device, the second connection is established with the proxy device based on the first device information and the second device information, and the proxy device replaces the Internet of Things device to send the keep-alive message to the cloud server through the second connection, so that the Internet of Things device may enter a low power consumption mode, thereby reducing the power consumption of the Internet of Things device. The cloud server transmits the wake-up information to the proxy device through the second connection with the proxy device, so as to wake up the Internet of Things device to enter the working mode. The keep-alive message of the Internet of Things device is sent through the second connection between the proxy device and the cloud server, and the proxy device acts as proxy to perform the keep-alive service.

According to the embodiment of the present disclosure, the proxy device acts as proxy to handle the keep-alive service of the Internet of Things device, thereby reducing frequent wake-up of the Internet of Things device, and accordingly, the power consumption of the Internet of Things device is reduced, the Internet of Things device and the proxy device establish secure connections with the cloud server respectively, and the keep-alive service between the Internet of Things device and the cloud server is achieved simply and efficiently.

Figure 13:
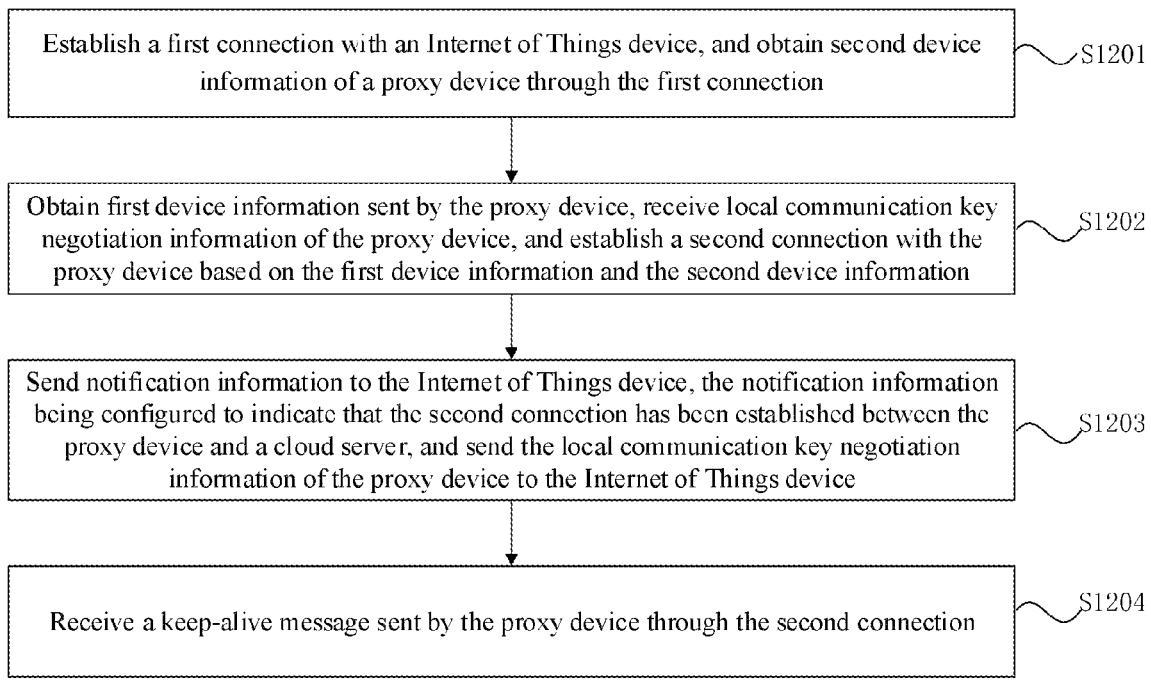
FIG. 13 is a flow diagram of a device control method according to another example of the present disclosure.

FIG. 13 is a flow diagram of a device control method according to another example of the present disclosure. As shown in FIG. 13, the device control method includes the following steps.

In step S1201, a first connection is established with an Internet of Things device, and second device information of a proxy device is obtained through the first connection.

In step S1202, first device information sent by the proxy device is obtained, local communication key negotiation information of the proxy device is received, and a second connection is established with the proxy device based on the first device information and the second device information.

In step S1203, notification information is sent to the Internet of Things device, the notification information being configured to indicate that the second connection has been established between the proxy device and a cloud server, and the local communication key negotiation information of the proxy device is sent to the Internet of Things device.

In step S1204, a keep-alive message sent by the proxy device is received through the second connection.

In the embodiment of the present disclosure, the cloud server authenticates the proxy device and the Internet of Things device respectively, and sends an authentication result to the Internet of Things device and the proxy device, and the Internet of Things device prevents access to an illegal proxy device. The authenticated proxy device establishes the second connection with the cloud server based on the first device information and the second device information, the proxy device sends the local communication key negotiation information of the proxy device to the cloud server, and the cloud server interacts with the proxy device and the Internet of Things device through secure channels, so as to establish an encrypted channel between the proxy device and the Internet of Things device.

According to the embodiment of the present disclosure, the proxy device acts as proxy to handle the keep-alive service of the Internet of Things device, the Internet of Things device and the proxy device separately use the cloud server to authenticate the identity of the other device, and establish a secure channel for communication therebetween to ensure that safe and effective information transmission between the Internet of Things device and the proxy device.

Figure 14:
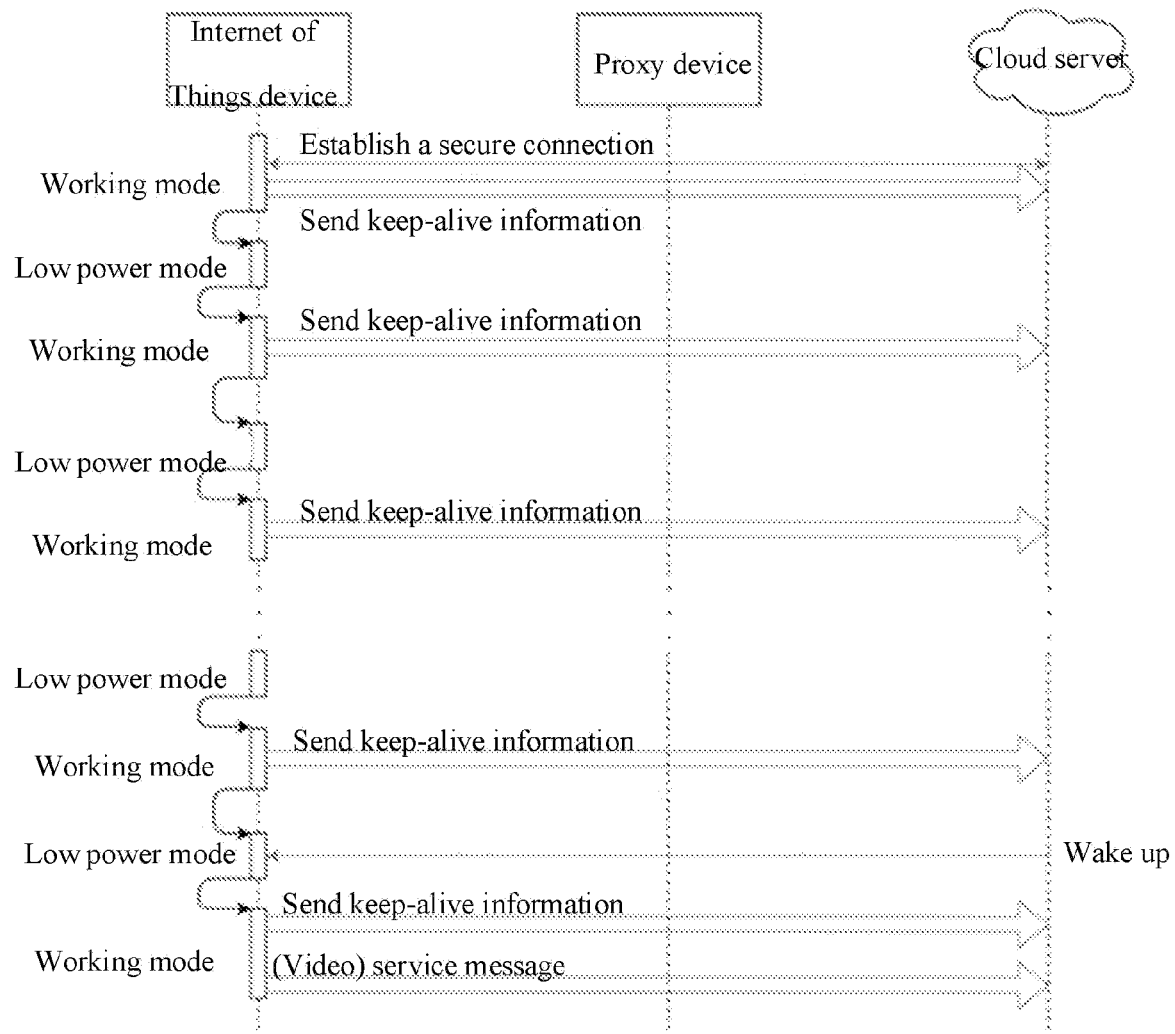
FIG. 14 shows a schematic diagram of interaction among an Internet of Things device, a proxy device and a cloud server applying a device control method of the present disclosure.

FIG. 14 shows a schematic diagram of interaction among an Internet of Things device, a proxy device and a cloud server applying a device control method of the present disclosure. Referring to FIG. 14, when the Internet of Things device is connected to the network, whether the proxy device connected to the Internet of Things device supports the proxy keep-alive function is queried through the detect message, and the detect message sent by the Internet of Things device will carry the first device information of the Internet of Things device, so as to authenticate the Internet of Things device by the proxy device. When the proxy device may support the proxy keep-alive function, it will respond to the detect response message, and send the second device information of the proxy device to the Internet of Things device, so that the Internet of Things device can authenticate the proxy device. After the Internet of Things device receives a reply from the proxy device, the Internet of Things device establishes the first connection with the cloud server, and sends the received device information of the proxy device to the cloud server, and the cloud server authenticates the security of the proxy device.

The proxy device carries the first device information and the second device information to establish the second connection with the cloud server, and carries the local communication key negotiation information, and the local communication key negotiation information is configured to establish the encrypted channel between the Internet of Things device and the proxy device, so that information transmission is performed between the Internet of Things device and the proxy device based on the encrypted channel.

The cloud server transmits the local communication key negotiation information and the authentication result of the proxy device to the Internet of Things device, and the proxy device periodically sends the keep-alive message of the Internet of Things device to the cloud server through the second connection and acts as proxy for the Internet of Things device to be connected to the cloud server in real time. The Internet of Things device determines that the notification information sent by the cloud server and indicating that the second connection has been established between the proxy device and the cloud server is received, the Internet of Things device is controlled to enter the low power consumption mode, and the first connection with the cloud server is disabled. When the Internet of Things device enters the low power consumption mode, the proxy device acts as proxy to send the keep-alive message of the Internet of Things device to the cloud server.

When the user operates to check the Internet of Things device, the cloud server sends the wake-up information to the proxy device through the second connection established with the proxy device, and after the proxy device receives the wake-up information from the cloud server, it transmits the wake-up information to the Internet of Things device through the encrypted channel, so as to wake up the Internet of Things device to enter the working mode. After the Internet of Things device is woken up, the first connection established with the cloud server is restored, and service messages of services such as video are transmitted to the cloud server through the first connection. After the proxy device sends the wake-up information to the Internet of Things device, sending the keep-alive message of the Internet of Things device to the cloud server through the second connection is kept.

According to the embodiment of the present disclosure, the proxy device replaces the Internet of Things device to connect to the cloud server in real time, and the proxy device acts as proxy to handle the keep-alive service of the Internet of Things device, thereby reducing frequent wake-up of the Internet of Things device, and accordingly, the power consumption of the Internet of Things device is reduced, and the user experience is improved.

Based on the same concept, an embodiment of the present disclosure further provides a device control apparatus.

Figure 15:
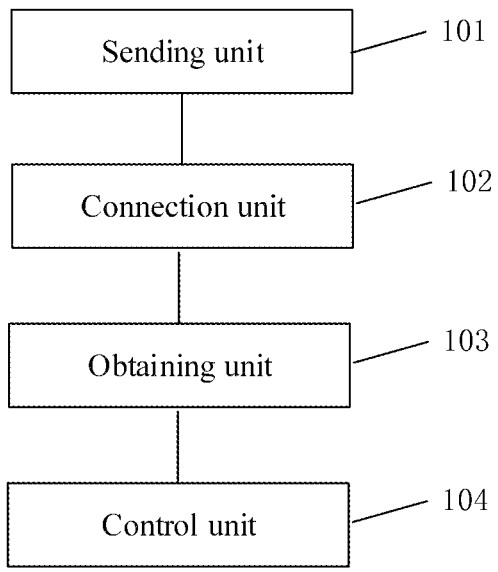
FIG. 15 is a block diagram of a device control apparatus according to an example of the present disclosure.

FIG. 15 is a block diagram of a device control apparatus according to an example of the present disclosure, and the device control apparatus is applied to an Internet of Things device. Referring to FIG. 15, the device control apparatus 100 includes a sending unit 101, a connection unit 102, an obtaining unit 103 and a control unit 104.

The sending unit 101 is configured to send first device information to a proxy device, the first device information being device information of the Internet of Things device, and the proxy device being configured to act as proxy for the Internet of Things device to send a keep-alive message to a cloud server, and to send device information of the proxy device to the cloud server through a first connection, so as to establish a second connection between the proxy device and the cloud server based on the first device information and second device information, and the second connection is configured to transmit the keep-alive message.

The connection unit 102 is configured to establish the first connection with the cloud server.

The obtaining unit 103 is configured to obtain the second device information, and the second device information is the device information of the proxy device.

The control unit 104 is configured to control, when it is determined that notification information sent by the cloud server is received, the Internet of Things device to enter a low power consumption mode, and the notification information is configured to indicate that the second connection has been established between the proxy device and the cloud server.

In some embodiments, the control unit 104 is further configured to control, upon receiving wake-up information sent by the proxy device, the Internet of Things device to enter a working mode.

In some embodiments, the connection unit 102 is further configured to: disconnect the first connection with the cloud server upon controlling the Internet of Things device to enter a low power consumption mode, and restore the first connection and transmit a service message to the cloud server through the first connection when the Internet of Things device enters the working mode.

In some embodiments, the notification information includes local communication key negotiation information of the proxy device and an authentication result of the proxy device by the cloud server.

In some embodiments, the connection unit 102 is further configured to: establish an encrypted channel with the proxy based on the local communication key negotiation information of the proxy device, and the encrypted channel is configured for information transmission between the Internet of Things device and the proxy device.

Figure 16:
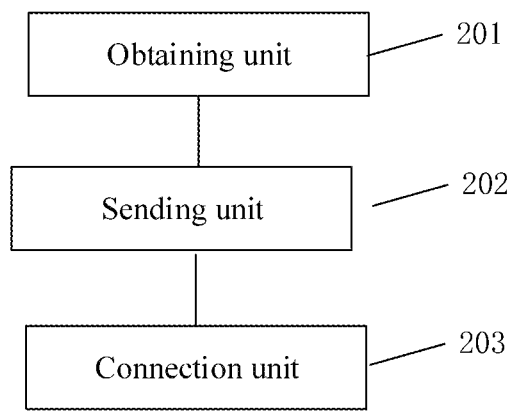
FIG. 16 is a block diagram of a device control apparatus according to another example of the present disclosure.

FIG. 16 is a block diagram of a device control apparatus according to another example of the present disclosure, and the device control apparatus is applied to a proxy device. Referring to FIG. 16, the device control apparatus 200 includes an obtaining unit 201, a sending unit 202 and a connection unit 203.

The obtaining unit 201 is configured to obtain first device information sent by an Internet of Things device, and the first device information is device information of the Internet of Things device.

The sending unit 202 is configured to send second device information to the Internet of Things device, to send the second device information to a cloud server by the Internet of Things device based on a first connection, and to send a keep-alive message of the Internet of Things device to the cloud server through a second connection.

The connection unit 203 is configured to establish the second connection with the cloud server based on the first device information and the second device information.

Figure 17:
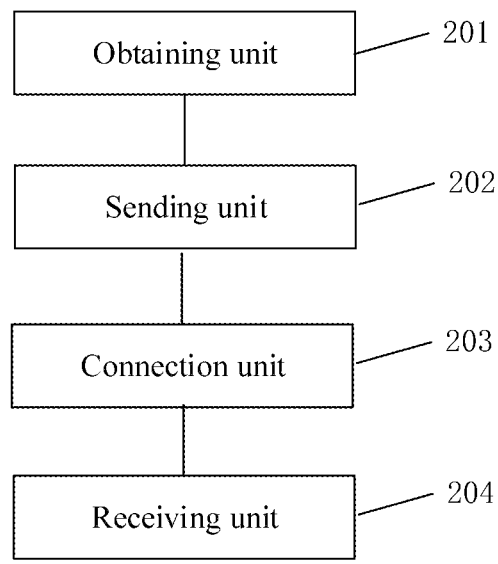
FIG. 17 is a block diagram of a device control apparatus according to another example of the present disclosure.

FIG. 17 is a block diagram of a device control apparatus according to another example of the present disclosure. Referring to FIG. 17, the device control apparatus further includes: a receiving unit 204.

The receiving unit 204 is configured to receive wake-up information sent by the cloud server, and the wake-up information is configured to wake up the Internet of Things device to enter a working mode; and the sending unit is further configured to send the wake-up information to the Internet of Things device.

In some embodiments, after sending the wake-up information to the Internet of Things device, the sending unit 202 keeps sending the keep-alive message of the Internet of Things device to the cloud server through the second connection.

In some embodiments, the sending unit 202 is further configured to: send local communication key negotiation information of the proxy device to the cloud server.

Figure 18:
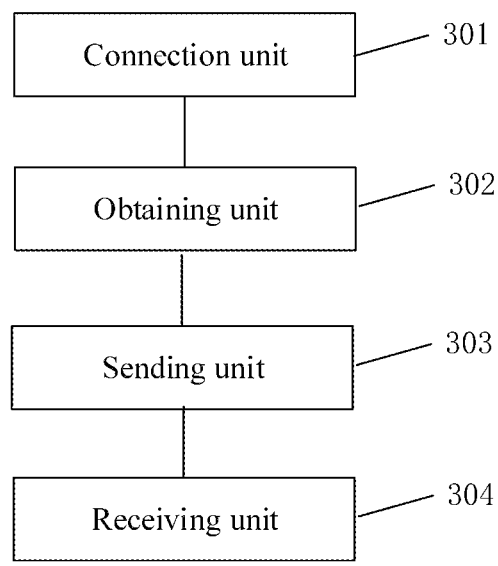
FIG. 18 is a block diagram of a device control apparatus according to another example of the present disclosure.

FIG. 18 is a block diagram of a device control apparatus according to an example of the present disclosure, and the device control apparatus is applied to a cloud server. Referring to FIG. 18, the device control apparatus 300 includes a connection unit 301, an obtaining unit 302, a sending unit 303 and a receiving unit 304.

The connection unit 301 is configured to establish a first connection with an Internet of Things device, and to establish a second connection with a proxy device based on first device information and second device information.

The obtaining unit 302 is configured to obtain the second device information of the proxy device through the first connection and the first device information sent by the proxy device.

The sending unit 303 is configured to send notification information to the Internet of Things device, and the notification information is configured to indicate that the second connection has been established between the proxy device and the cloud server.

The receiving unit 304 is configured to receive a keep-alive message sent by the proxy device through the second connection.

In some embodiments, the sending unit 303 is further configured to: send wake-up information to the proxy device, and the wake-up information is configured to wake up the Internet of Things device to enter a working mode.

In some embodiments, the sending unit 303 is further configured to: continuously receive the keep-alive message sent by the proxy device through the second connection after sending the wake-up information to the proxy device.

In some embodiments, the receiving unit 304 is further configured to: receive local communication key negotiation information of the proxy device; and the sending unit is further configured to: send the local communication key negotiation information of the proxy device to the Internet of Things device.

It can be understood that the apparatus provided by the embodiment of the present disclosure includes a hardware structure and/or software module corresponding to performing each function in order to realize the above functions. In combination with units and algorithm steps of each example disclosed in the embodiment of the present disclosure, the embodiment of the present disclosure can be implemented in the form of hardware or a combination of hardware and computer software. Whether a function is performed by hardware or computer software driving hardware depends on the specific application and design constraints of the technical solutions. Those skilled in the art can use different methods to implement the described functions for each specific application, but such implementation should not be considered to be beyond the scope of the technical solutions of the embodiments of the present disclosure.

As for the apparatus in the above embodiments, the specific manner in which each module performs operations has been described in detail in the embodiments of the method, and detailed description will not be given here.

Figure 19:
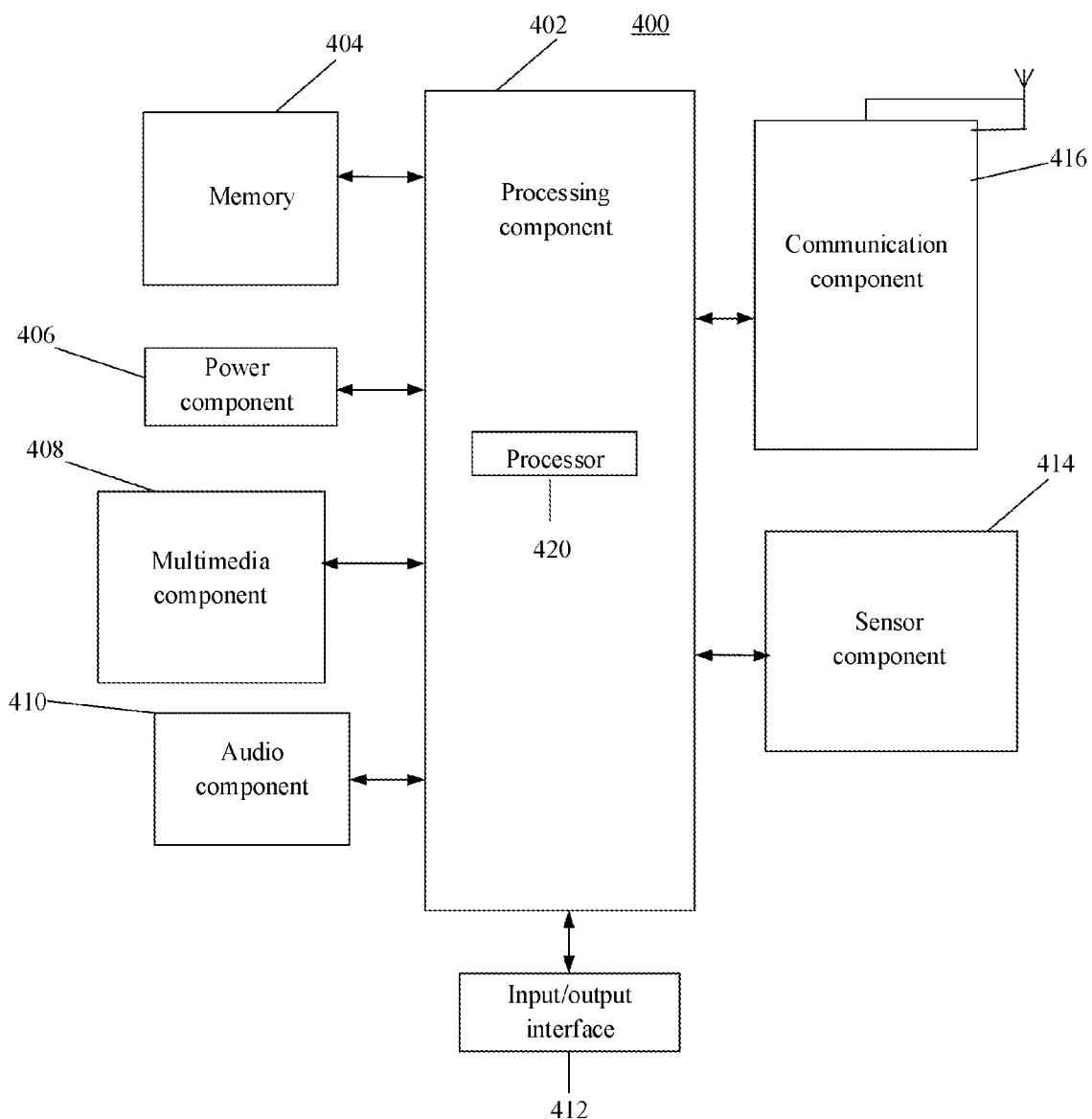
FIG. 19 is a block diagram of a device control apparatus according to an example of the present disclosure.

FIG. 19 is a block diagram of an apparatus 400 for device control according to an example of the present disclosure. For example, the apparatus 400 may be a mobile phone, a computer, a digital broadcasting terminal, a messaging device, a game console, a tablet device, a medical device, a fitness device, a personal digital assistant, etc.

Referring to FIG. 19, the apparatus 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls the overall operation of the apparatus 400, such as operations associated with display, telephone call, data communication, camera operations, and recording operations. The processing component 402 may include one or more processors 440 to execute instructions to complete all or part of the steps of the above method. In addition, the processing component 402 may include one or more modules to facilitate interaction between the processing component 402 and other components. For example, the processing component 402 may include a multimedia module to facilitate interaction between the multimedia component 408 and the processing component 402.

The memory 404 is configured to store various types of data to support operations at the apparatus 400. Examples of these data include instructions for any application or method operating on the apparatus 400, contact data, phonebook data, messages, pictures, videos, etc. The memory 404 may be implemented by any type of volatile or nonvolatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or optic disk.

The power component 406 provides power for various components of the apparatus 400. The power component 406 may include a power management system, one or more power sources and other components associated with generating, managing and distributing power for the apparatus 400.

The multimedia component 408 includes a screen providing an output interface between the apparatus 400 and a user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding and gestures on the touch panel. The touch sensor can not only sense the boundary of the touch or sliding operation, but also detect the duration and pressure related to the touch or sliding operation. In some embodiments, the multimedia component 408 includes a front camera and/or a rear camera. When the apparatus 400 is in an operation mode, such as a shooting mode or a video mode, the front camera and/or the rear camera can receive external multimedia data. Each front camera and rear camera may be a fixed optical lens system or have a focal length and optical zoom capability.

The audio component 410 is configured to output and/or input audio signals. For example, the audio component 410 includes a microphone (MIC) configured to receive an external audio signal when the apparatus 400 is in the operation mode, such as a call mode, a recording mode, and a speech recognition mode. The received audio signal may be further stored in the memory 404 or transmitted via the communication component 416. In some embodiments, the audio component 410 also includes a speaker for outputting an audio signal.

The I/O interface 412 provides an interface between the processing component 402 and a peripheral interface module which may be a keyboard, a click wheel, a button, etc. These buttons may include but are not limited to: a home button, volume buttons, a start button and a lock button.

The sensor component 414 includes one or more sensors for providing state evaluation of various aspects of the apparatus 400. For example, the sensor component 414 may detect an on/off state of the apparatus 400 and the relative positioning of the components, for example, the component is a display and a keypad of the apparatus 400. The sensor component 414 may also detect the change of the position of the apparatus 400 or one component of the apparatus 400, the presence or absence of user contact with the apparatus 400, the azimuth or acceleration/deceleration of the apparatus 400, and temperature change of the apparatus 400. The sensor component 414 may include a proximity sensor configured to detect the presence of nearby objects without any physical contact. The sensor component 414 may further include an optical sensor, such as a CMOS or CCD image sensor, for use in imaging applications. In some embodiments, the sensor component 414 may further include an acceleration sensor, a gyroscope sensor, a magnetic sensor, a pressure sensor, or a temperature sensor.

The communication component 416 is configured to facilitate wired or wireless communication between the apparatus 400 and other devices. The apparatus 400 may access a wireless network based on a communication standard, such as WiFi, 4G or 3G, or a combination thereof. In an example, the communication component 416 receives a broadcast signal or broadcast-related information from an external broadcast management system via a broadcast channel. In an example, the communication component 416 further includes a near field communication (NFC) module to facilitate short-range communication. For example, the NFC module may be implemented based on radio frequency identification (RFID) technology, infrared data association (IrDA) technology, ultra wideband (UWB) technology, Bluetooth (BT) technology and other technologies.

In an example, the apparatus 400 may be implemented by one or more application-specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements for performing the above method.

In an example, a non-temporary computer-readable storage medium including instructions, such as the memory 404 including instructions, which can be executed by the processor 440 of the apparatus 400 to complete the above method, is also provided. For example, the non-temporary computer-readable storage medium may be a ROM, a random access memory (RAM), a CD-ROM, a magnetic tape, a floppy disk, an optical data storage device, etc.

It can be understood that "a plurality of" in the present disclosure refers to two or more, to which other quantifiers are similar. "And/or" describes the association relationship of associated objects, which means that there may be three kinds of relationships, for example, A and/or B may mean that there are three kinds of situations: A alone, A and B at the same time, and B alone. The character "/" universally indicates that associated objects are in an "or" relationship. The singular forms "one", "said" and "the" are also intended to include the majority forms unless the context clearly indicates other meanings.

It can be further understood that the terms "first", "second" and the like are used to describe various information, but these information should not be limited to these terms. These terms are only used to distinguish the same type of information from each other, and do not indicate a specific order or importance. In fact, the expressions "first" and "second" can be used interchangeably. For example, without departing from the scope of the present disclosure, first information may also be referred to as second information, and similarly, the second information may also be referred to as the first information.

It can be further understood that unless otherwise specified, "connection" includes the direct connection between the two without other members, and also includes the indirect connection between the two with other elements.

It can be further understood that in the embodiments of the present disclosure, although the operations are described in a specific order in the drawings, it should not be understood as requiring these operations to be performed in the specific order or serial order shown, or requiring all the operations shown to be performed to achieve the desired results. Multitasking and parallel processing may be advantageous in a particular environment.

Other implementations of the present disclosure will be apparent to those skilled in the art from consideration of the specification and practice of the present disclosure herein. The present application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The invention claimed is:

1. A device control method, applied to an Internet of Things device, comprising:
    sending first device information to a proxy device, the first device information being device information of the Internet of Things device, and the proxy device being configured to act as a proxy for the Internet of Things device to send a keep-alive message to a cloud server;
    obtaining second device information, the second device information being device information of the proxy device;
    establishing a first connection with the cloud server, and sending the device information of the proxy device to the cloud server through the first connection, so as to establish a second connection between the proxy device and the cloud server based on the first device information and the second device information, the second connection being configured to transmit the keep-alive message; and
    in response to determining that notification information sent by the cloud server is received, controlling the Internet of Things device to enter a low power consumption mode, the notification information being configured to indicate that the second connection has been established between the proxy device and the cloud server.

2. The device control method according to claim 1, further comprising:
    in response to receiving wake-up information sent by the proxy device, controlling the Internet of Things device to enter a working mode.

3. The device control method according to claim 1, further comprising:
    disconnecting the first connection with the cloud server in response to controlling the Internet of Things device to enter the low power consumption mode, and restoring the first connection and transmitting a service message to the cloud server through the first connection when the Internet of Things device enters a working mode.

4. The device control method according to claim 2, further comprising:
    disconnecting the first connection with the cloud server in response to controlling the Internet of Things device to enter the low power consumption mode, and restoring the first connection and transmitting a service message to the cloud server through the first connection when the Internet of Things device enters the working mode.

5. The device control method according to claim 1, wherein the notification information comprises local communication key negotiation information of the proxy device and an authentication result of the proxy device by the cloud server.

6. The device control method according to claim 5, further comprising:
    establishing an encrypted channel with the proxy device based on the local communication key negotiation information of the proxy device, the encrypted channel being configured for information transmission between the Internet of Things device and the proxy device.

7. A device control method, applied to a proxy device, and comprising:
    obtaining first device information sent by an Internet of Things device, the first device information being device information of the Internet of Things device;
    sending second device information to the Internet of Things device, and the second device information being configured to be sent to a cloud server by the Internet of Things device based on a first connection;
    establishing a second connection with the cloud server based on the first device information and the second device information;
    sending a keep-alive message of the Internet of Things device to the cloud server through the second connection when the Internet of Things device enters a low power consumption mode;
    receiving wake-up information sent by the cloud server, the wake-up information being configured to wake up the Internet of Things device to enter a working mode; and
    sending the wake-up information to the Internet of Things device,
    wherein after sending the wake-up information to the Internet of Things device, sending the keep-alive message of the Internet of Things device to the cloud server through the second connection is kept.

8. The device control method according to claim 7, further comprising:
    sending local communication key negotiation information of the proxy device to the cloud server.

9. A device control method, applied to a cloud server, and comprising:
    establishing a first connection with an Internet of Things device, and obtaining second device information of a proxy device through the first connection;
    obtaining first device information sent by the proxy device, and establishing a second connection with the proxy device based on the first device information and the second device information;
    sending notification information to the Internet of Things device, the notification information being configured to indicate that the second connection has been established between the proxy device and the cloud server;
    receiving a keep-alive message sent by the proxy device through the second connection when the Internet of Things device enters a low power consumption mode;
    sending wake-up information to the proxy device, the wake-up information being configured to wake up the Internet of Things device to enter a working mode; and
    continuously receiving the keep-alive message sent by the proxy device through the second connection after sending the wake-up information to the proxy device.

10. The device control method according to claim 9, further comprising:
    receiving local communication key negotiation information of the proxy device; and
    sending the local communication key negotiation information of the proxy device to the Internet of Things device.

11. A device control apparatus, comprising:
    a processor;
    a communication component;
    an input/output interface; and
    a memory configured to store processor-executable instructions;

wherein the processor, the communication component, and the input/output interface are configured to execute the device control method according to claim 1.

12. A device control apparatus, comprising:
a processor;
a communication component;
an input/output interface; and
a memory configured to store processor-executable instructions;
wherein the processor, the communication component, and the input/output interface are configured to execute the device control method according to claim 7.

13. A device control apparatus, comprising:
a processor;
a communication component;
an input/output interface; and
a memory configured to store processor-executable instructions;
wherein the processor, the communication component, and the input/output interface are configured to execute the device control method according to claim 9.

14. A non-transitory storage medium, storing instructions, wherein the instructions in the non-transitory storage medium cause a terminal to execute the device control method according to claim 1 when executed by a processor of the terminal.

15. A non-transitory storage medium, storing instructions, wherein the instructions in the non-transitory storage medium cause a terminal to execute the device control method according to claim 7 when executed by a processor of the terminal.

16. A non-transitory storage medium, storing instructions, wherein the instructions in the non-transitory storage medium cause a terminal to execute the device control method according to claim 9 when executed by a processor of the terminal.

* * * * *